No. 716,934. Patented Dec. 30, 1902.
J. R. & C. E. PORTER.
FERTILIZER SPREADER.
(Application filed May 17, 1902.)
(No Model.) 2 Sheets—Sheet 1.
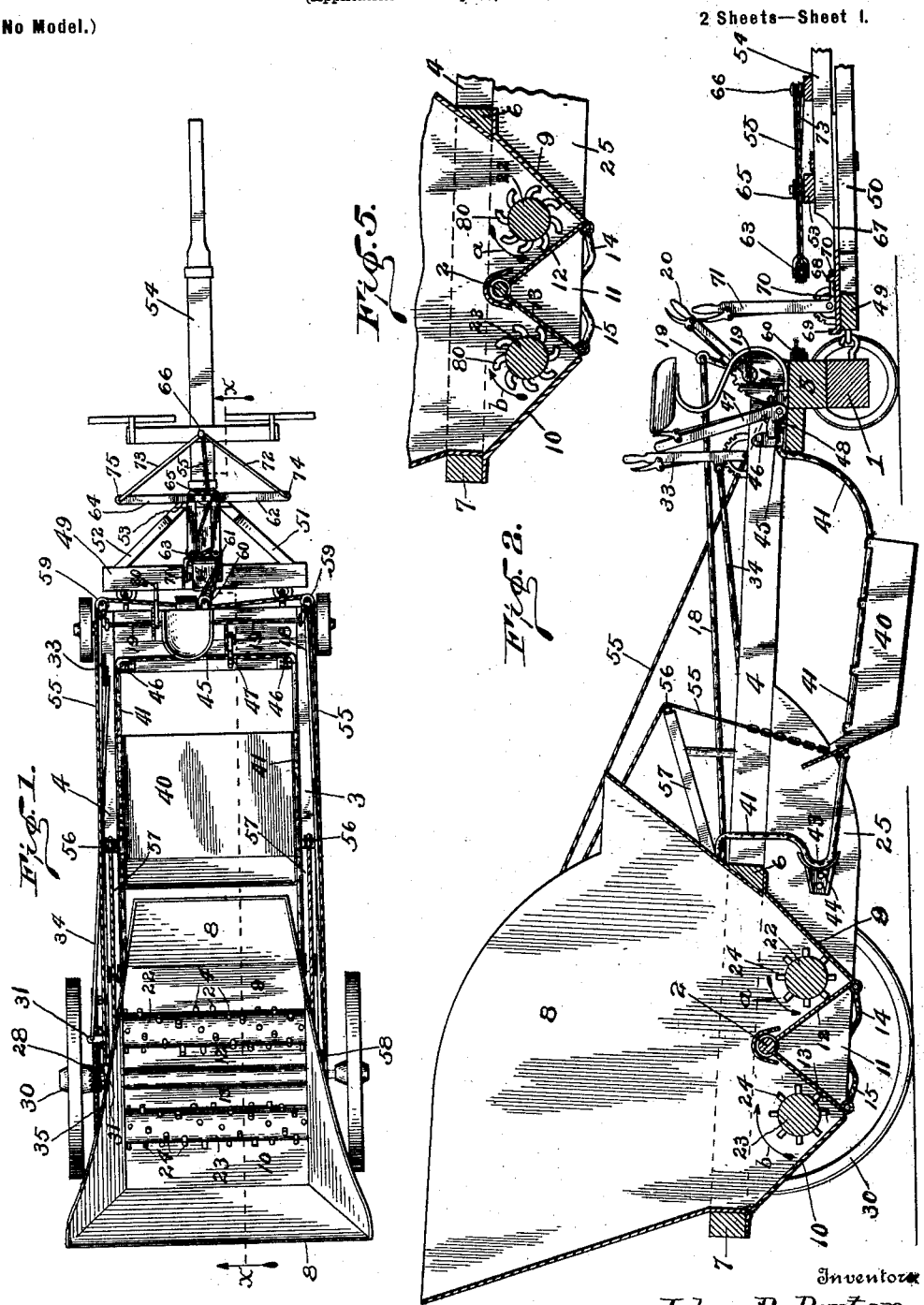
Witnesses
C. S. Frye
A. G. Miller
Inventors
John R. Porter
and Charles E. Porter,
By
W. T. Fitzgerald
Attorneys
THE NORRIS PETERS CO., PHOTO-LITHO., WASHINGTON, D. C.

No. 716,934.
J. R. & C. E. PORTER.
FERTILIZER SPREADER.
(Application filed May 17, 1902.)
(No Model.)
Patented Dec. 30, 1902.
2 Sheets—Sheet 2.
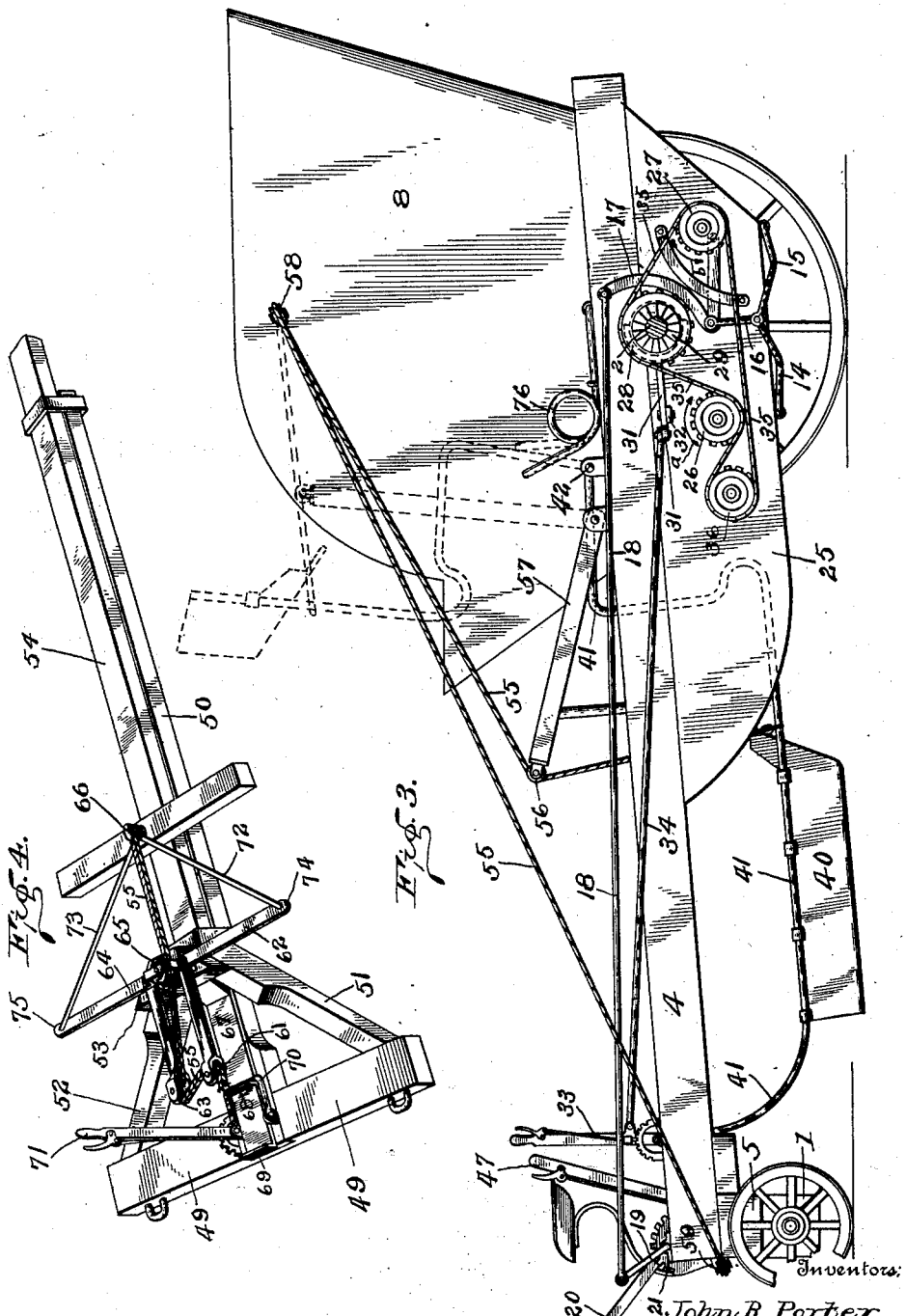
Witnesses
C. S. Frye.
A. S. Miller.
Inventors:
John R. Porter
and Charles E. Porter,
By
W. T. Fitz Gerald
Attorneys

UNITED STATES PATENT OFFICE.

JOHN R. PORTER AND CHARLES E. PORTER, OF PHILBROOK, MONTANA.

FERTILIZER-SPREADER.

SPECIFICATION forming part of Letters Patent No. 716,934, dated December 30, 1902.

Application filed May 17, 1902. Serial No. 107,779. (No model.)

*To all whom it may concern:*

Be it known that we, JOHN R. PORTER and CHARLES E. PORTER, citizens of the United States, residing at Philbrook, in the county of Fergus and State of Montana, have invented certain new and useful Improvements in Fertilizer-Spreaders; and we do hereby declare the following to be a full, clear, and exact description of the invention, such as will enable others skilled in the art to which it appertains to make and use the same.

Our invention relates to certain new and useful improvements in fertilizer loaders and distributers of that class wherein the loader is carried upon the same vehicle as the spreader or distributer.

Our object is to provide a device whereby the fertilizer or other substance may be gathered and elevated into the hopper of the distributing part of the device with the same draft-animals that haul the vehicle without unhitching them from the vehicle.

It is also our object to so arrange the parts that the machine may be manipulated from the front end of the vehicle by the operator without the necessity of his leaving his seat.

This device may also be used in excavating and grading, such as streets, public highways, and the like.

With these ends in view the invention consists of certain novel features of construction and arrangement of parts, as will be hereinafter more fully described, and pointed out in the claim.

In the accompanying drawings, Figure 1 is a top plan view of our device complete. Fig. 2 is a central vertical section of the same on line *x x* of Fig. 1. Fig. 3 is a side elevation thereof on a slightly-enlarged scale, the driving-wheel or the side shown being removed. Fig. 4 is a perspective view of the tongue and parts carried thereby removed from the spreader proper. Fig. 5 is a detail sectional view of the spreading apparatus, showing a varied form of agitator.

Referring to the drawings, 1 indicates the front axle, and 2 the rear axle, the said axles carrying the frame or body portion of our device. The said frame is composed of the side rails 3 and 4, bolster 5, and cross-bars 6 and 7.

Mounted between the side rails 3 and 4 and cross-bars 6 and 7 is a hopper or receptacle 8, the top thereof being flared, the bottom edges 9 and 10 being brought toward each other, leaving only a narrow opening 11 in the bottom portion. When the hopper 8 is being filled or transported, it is necessary to close the opening 11, and to accomplish this we provide gates or doors 12 and 13, pivotally mounted upon the axle 2. Through the medium of the retaining-bars 14 and 15, link 16, bell-crank 17, connecting-rod 18, crank-shaft 19, lever 20, and rack 21 it will be seen that we have provided a means whereby the doors 12 and 13 may be opened or closed at will by the operator at the front of the vehicle. In order that the contents of the hopper may pass through the opening 11 in a uniform quantity, we have provided agitators 22 and 23, having teeth 24 around their peripheries, so that should the manure or other substance be massed together when thrown into the hopper the teeth 24 will pulverize the same before it passes through the opening 11. The agitators 22 and 23 extend transversely across the bottom portion of the hopper 8 at either side and a little above the opening 11, the ends thereof finding bearings in the depending portions 25 of the side rails 3 and 4, one end of each bearing being elongated and reduced in size to receive the sprockets 26 and 27, which are fixedly secured thereon. Slidably mounted upon the axle 2 is a driving-sprocket 28, the outer hub of the sprocket being provided with a clutch-face, as shown at 29, to coöperate with a corresponding face carried by the inner end of the hub 30, serving to rotate the sprocket 28 when thrown into engagement therewith. The opposite hub of the sprocket is provided with an annular groove to receive the bifurcated end of the bell-crank shifting-lever 31, said lever being pivotally mounted upon the bracket 32, which is in turn secured to the depending side piece 25. The said sprocket is designed to be thrown in and out of engagement with the clutch-face of the hub 30 by the operator at the front end of the vehicle and is accomplished by means of the rack-bar and lever 33, mounted upon the front end of the side rail 4, and rod 34, connecting the lever 33 and bell-crank lever 31.

In order to drive the agitators 22 and 23, a sprocket-chain 35 takes into the driving-sprocket 28, thence under the sprocket 26 around an idler-sprocket 36, and thence around the sprocket 27. Thus when the sprocket 28 is thrown into engagement with the driving-wheel 30 the agitators will be rotated toward each other, as indicated by the arrows a and b.

In order to quickly and easily fill the hopper 8, we have supplied a scoop 40 or the like, carried by the frame 41, the said frame being hinged or otherwise mounted upon the side rails 3 and 4 alongside the hopper, as indicated by the numeral 42 in Fig. 3. At a point where the frame 41 changes from a horizontal to a vertical position a U-shaped loop 43 is formed, the said loop taking into a stop or bracket 44. This stop or bracket limits the downward movement of the scoop 40 and also receives the backward pressure of the scoop while it is being filled. The forward end of the frame 41 is bent up, the transverse portion 45 thereof being adapted to pass beyond upright posts 46, attached to a portion of the bolster 5. The scoop 40 is held down by means of the lever 47, the said lever having a lateral curved arm 48, which takes over the transverse portion 45 of the frame 41, as shown more clearly in Fig. 3. It will be seen that the scoop will be held rigidly in place while being filled through the medium of the bracket 44, posts 46, and lever 47, at the same time relieving the pivot-points 42 of any undue strain.

Secured to the front axle 1 in any preferred manner is a cross-bar 49, which carries the stationary portion of the tongue 50, the said tongue being held rigid with respect to the cross-bar 49 by hounds 51 and 52. These hounds are sufficiently widened near their outer ends, so that when the plate 53 is placed on the upper edges thereof sufficient space is provided to allow the inner end of the auxiliary tongue 54 to pass freely therethrough.

In order to elevate the scoop 40 after it has been filled, one end of cables 55 is attached to the frame 41 at any convenient point, preferably in the rear of the scoop, passing up over sheaves 56, located upon the ends of swinging posts 57, said posts being hinged at their opposite ends to the side rails 3 and 4, respectively. The cables then pass around sheaves 58, attached to the sides of the hopper 8, around sheaves 59 at the ends of the bolster 5, and through a double sheave 60, located centrally upon the outer face of the bolster 5. From their double sheave 60 to their forward terminals the cables 55 extend contiguous to and parallel with each other, preferably one above the other, passing first around a sheave 61, carried in the bifurcated end of the bell-crank lever 62, thence around a sheave 63, carried in the bifurcated end of the bell-crank levers 64, passing thence to the guiding-sheave 65, the said sheave being mounted upon the plate 53, and thence to the bolt or pin 66, to which the outer ends of the cables 55 are secured. The pin 66 is carried by the auxiliary tongue 54. It becomes necessary to take up a considerable length of the cables 55 in transferring the load from the scoop 40 into the hopper 8, and to accomplish this result with a minimum travel forward of the draft-animals we have provided the aforementioned bell-crank levers 62 and 64 and the auxiliary tongue 54. The tongue 54 carries at its inner end a plate 67, the said plate having detents 68 and 69, adapted to be engaged by the clevis-shaped portion 70 of the lever 71. The bell-crank levers 62 and 64 are pivotally mounted upon the plate 53 at either side of the sheave 65 and are caused to rotate thereon by the rods 72 and 73, one end of said rods engaging the bolt 66, the opposite end thereof engaging the outer ends 74 and 75, respectively, of the bell-crank levers 62 and 64.

In operation, the respective parts being in the positions shown in the figures, the draft-animals are driven forward, drawing the entire vehicle until the scoop 40 has been filled. The lever 71 is then thrown back until the clevis-shaped portion 70 is disengaged from the detent 68 and the lever 47 thrown forward until the arm 48 is free of the portion 45 of the frame 41, when the draft-animals may be driven forward and the scoop elevated to the position shown in dotted lines in Fig. 3, the contents of the scoop falling into the hopper 8. When the detent 68 has been released and the draft-animals driven forward, the auxiliary tongue 54 and the parts carried thereby is all that moves, the vehicle proper remaining stationary. As the pin 66 is carried by the auxiliary tongue 54, the rods 72 and 73 are caused to travel with the said tongue, and as the bell-crank levers 62 and 64 are pivoted to the stationary plate 53 the outer ends 74 and 75 are drawn around until they are substantially parallel with the tongue, thereby separating the bifurcated ends of the bell-crank levers. It will now be seen that by this means a sufficient length of the cables 55 will have been pulled forward to elevate the scoop 40, causing the draft-animals to travel forward but a short distance. After the hopper 8 has been filled an additional scoopful may be hauled by throwing the lever 71 forward again after the detent 68 has passed beyond the clevis 70, so as to engage the detent 69, thereby partially elevating the scoop 40, and owing to the continual pull upon the cables 55 the scoop is held partially elevated until the hopper 8 has been wholly or partially emptied, when by releasing the clevis 70 from the detent 69 the auxiliary tongue is allowed to move on to its full extent, elevating the scoop to the required position. The scoop is also held suspended above the ground on the return trip by the means above described, it being only necessary to back the draft-animals until the clevis 70 engages the detent 68 in order to lower the scoop ready for operation. When the scoop 40 is elevated, as shown by dotted lines in Fig. 3, the frame 41 comes in contact with a spring 76, said spring serving to regulate the backward movement of the scoop and also assists in starting the scoop on its downward course after the load has been dumped and the tension of the cables 55 released. After the hopper 8 has been filled with manure or other fertilizing substance it is transported to the field where it is desired to evenly spread the manure, this result being accomplished by first throwing the lever 20 back, opening the doors 12 and 13, then by throwing the lever 33 forward, the sprocket 28 is thrown into engagement with the clutch on the hub 30, causing the agitators 22 and 23 to rotate and spread the manure evenly over the ground.

In Fig. 5 we have shown a modified form of agitator, wherein the teeth 80 are curved rearwardly from the direction in which they rotate, thereby obviating any accumulation of straw or other substances between said teeth.

Having thus fully described our invention, what we claim as new, and desire to secure by Letters Patent, is—

In a machine of the character specified, the combination with a suitable carrying-frame and trucks therefor, of a hopper having means to discharge its contents in a disintegrated condition; means comprising a scoop coöperating with said hopper to gather the manure or the like from the ground and coöperating devices connected with the scoop adapted to drag the same over the ground and elevate it when filled, whereby the contents thereof will be delivered into said hopper, all combined substantially as specified and for the purpose set forth.

In testimony whereof we affix our signatures in presence of two witnesses.

JOHN R. PORTER.
CHARLES E. PORTER.

Witnesses:
HUGH KANE,
H. G. PHILLIPS.